United States Patent

Mayer

[15] 3,654,942
[45] Apr. 11, 1972

[54] MECHANICALLY LOCATED VALVE AND METHOD OF USING SAME

[72] Inventor: Harry E. Mayer, Newberry, S.C.
[73] Assignee: Mayer Flood Systems Inc.
[22] Filed: June 8, 1970
[21] Appl. No.: 44,442

[52] U.S. Cl. .............................. 137/1, 251/144, 251/147, 61/25
[51] Int. Cl. ........................................ F16k 1/20, F16k 31/44
[58] Field of Search .................. 251/144, 147, 294, 303, 298, 251/299, 368; 137/527.6, 1, 15; 61/12, 22, 23, 24, 25, 28; 4/52, 249

[56] References Cited

UNITED STATES PATENTS

| | | | |
|---|---|---|---|
| 1,612,463 | 12/1926 | Myers | 251/147 X |
| 1,123,813 | 1/1915 | Smith | 251/147 |
| 3,487,476 | 1/1970 | Stiern et al. | 4/52 X |
| 269,712 | 12/1882 | Renk | 61/24 |
| 788,015 | 4/1905 | Bergman | 251/294 X |
| 1,670,520 | 5/1928 | Pekrul | 61/25 |
| 2,953,345 | 9/1960 | Slemmons et al. | 251/144 |

*Primary Examiner*—William R. Cline
*Attorney*—Lane, Aitken, Dunner & Ziems

[57] ABSTRACT

A valve for controlling the flow of fluid through a passage defined in a fluid distribution system and the method of using such a valve for controlling fluid flow, for example, to clean the stall area in a barn located adjacent to the passage. The valve includes a fluid impermeable member which is selectively located relative to the passage to prevent fluid flow, or to permit fluid flow at a selected rate through the range from no flow to maximum flow conditions. A resilient, elastomeric sealing member cooperates with the fluid impermeable member in the passage to prevent fluid flow when the valve is in its closed position. Means are provided for selectively locating the position of the fluid impermeable member throughout its range. The locating means include a winch for controlling cable connected to opposite sides of the valve member. In a preferred embodiment, the fluid impermeable member is secured to a vehicle wheel rim on which is mounted a pneumatic vehicle tire. Means are provided to cause the pivoting of the member, rim, and tire as a unit into and out of a sealing relationship with the passage.

A method of using the valve includes the steps of providing a source of fluid, positioning the valve to control the flow of fluid through the passage, and controlling the movement of the valve member to control the flow of fluid. In a preferred embodiment, the method includes the step of cleaning an area adjacent to the valve, for example, the stall area of a barn.

15 Claims, 5 Drawing Figures

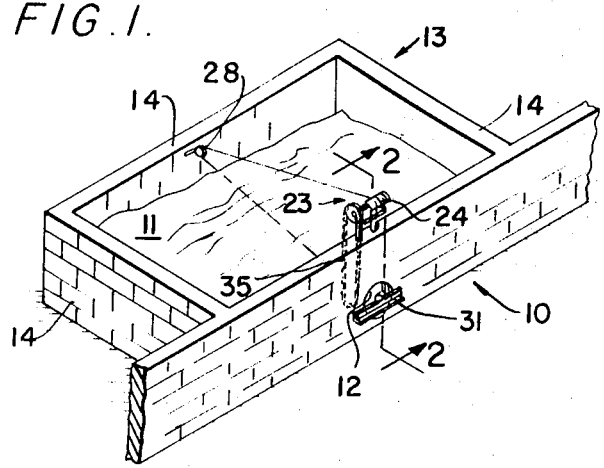
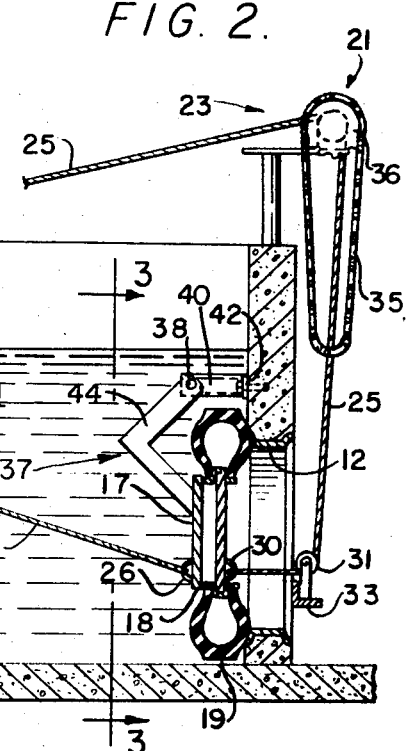
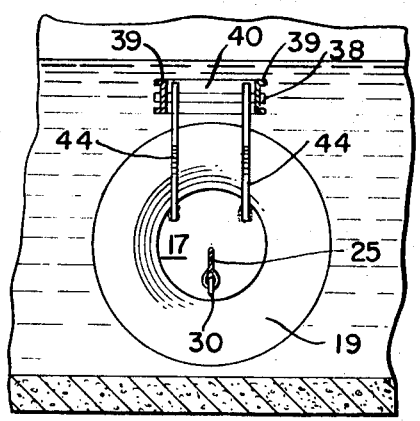
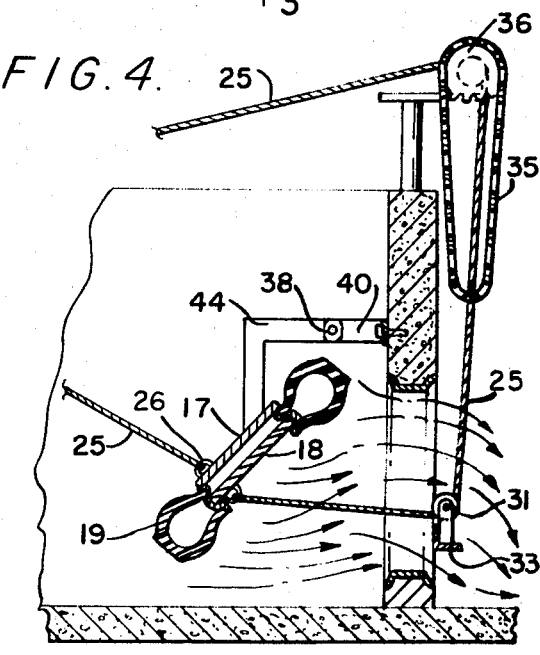
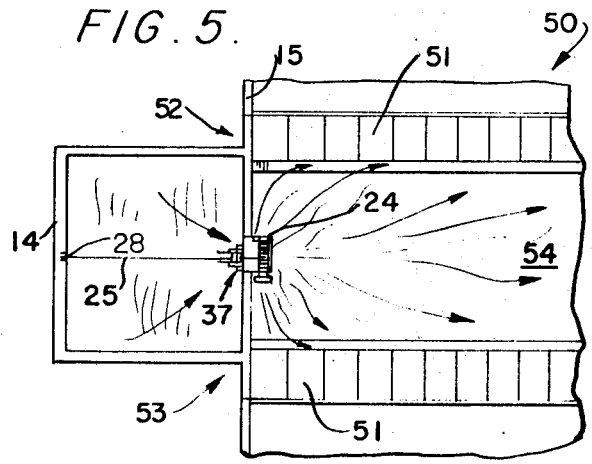
INVENTOR
HARRY E. MAYER
BY Lane, Aitken, Dunner & Ziems
ATTORNEYS

3,654,942

MECHANICALLY LOCATED VALVE AND METHOD OF USING SAME

BACKGROUND OF THE INVENTION

This invention relates to a valve for controlling the flow of fluid through a passage wherein the valve may be constructed from commercially available components. More particularly, this invention relates to a valve which includes a pneumatic vehicle tire mounted upon a vehicle wheel rim as the operative component of the valve. Still more particularly, this invention relates to the method of using such a valve for controlling fluid for use, for example, in cleaning the stall area of a barn.

The art of controlling the flow of fluid through a passage is replete with numerous examples of valves having a wide variety of capabilities. Where the fluid passageway, however, is of relatively large diameter, for example, about one foot or more, costly arrangements or complicated structures must generally be used to control the fluid flow. An example of such an arrangement is a gate valve.

The problems of providing a fluid control valve for use in a fluid distribution system which does not include a piping arrangement are further compounded. Generally, such fluid control mechanisms must be specially designed and fabricated, at an increase in cost to the user. Thus, it is a problem in the art to control unpiped fluid flow through relatively large passages while yet minimizing the cost of the installation.

It is also an object of this invention to provide such a valve which may be manufactured from commercially available components. When so manufactured, it is preferred that the embodiment be assembled in situ from readily available commercial parts. In additions, for the primary fields of use contemplated for the valve of this invention, it is preferable that the valve be both positive opening and positive closing as well as manually operable so that the operator may control the positioning of the valve in accordance with the needs of the particular installation without requiring switching circuitry.

Moreover, in such an environment, it is further desirable that such a valve be operable without the need for an external source of power so that the valve may be installed, for example, in rural areas and operated at a minimum cost. In a particular use contemplated by the installation for the invention, it is desired to control the flow of fluid for cleaning an area located adjacent to a source of stored water. For example, it is a problem to provide a convenient and inexpensive method for repeatedly and periodically cleaning the area of a barn in which livestock are housed. Accordingly, it is another aim of the invention to provide a convenient and economic method for cleaning a barn with a valve which is subject to the contraints described above.

Additional objects of the invention will be apparent from a review of this specification and a study of the accompanying drawings.

BRIEF SUMMARY OF THE INVENTION

Directed to overcoming the problems in the art of controlling the flow of fluid within the constraints described above, the valve according to the invention includes a fluid impermeable member which may be located relative to a fluid passageway for controlling the flow of fluid therethrough. Sealing means, comprising a resilient, elastomeric member, cooperate with the fluid impermeable member in the passage to prevent fluid flow through the passage when the valve is in its closed position. Means, including a winch for controlling cable connected to the opposed sides of the valve member, are provided for selectively locating the position of the fluid impermeable member relative to the passage. In a preferred embodiment, the fluid impermeable member includes a plate secured to a vehicle wheel rim on which is mounted a pneumatic vehicle tire. The fluid impermeable plate, the rim, and the tire are pivoted into and out of a sealing relationship with the passage to control fluid flow. Thus, the valve may be constructed from readily available commercial components.

The method of using the valve according to the invention includes the steps of providing a source of fluid, positioning the valve relative to the passage and controlling the movement of the valve relative to the passage to control the flow of fluid therethrough. In a preferred embodiment, the method includes the step of storing a volume of fluid at a position adjacent to the passage and controlling the flow of fluid from the stored volume to effect the cleaning of an area adjacent to the passage on a side opposite to the stored fluid. By controlling the release of fluid from the stored volume, the cleansing action of the fluid on the adjacent surface located, for example, in a barn, may be readily controlled with commercially available components.

BRIEF DESCRIPTION OF THE DRAWINGS

In the drawings:

FIG. 1 is a perspective view of a portion of a fluid storage and distribution system illustrating portions of the valve according to the invention;

FIG. 2 is a side view, partially in section, taken along line 2—2 of FIG. 1;

FIG. 3 is a front view of the valve taken along line 3—3 of FIG. 2;

FIG. 4 is a side view similar to FIG. 2 but showing the valve in its partially-open position and the flow of fluid through the passage; and FIG. 5 is a plan view illustrating the use of the valve according to the invention in controlling the release of stored fluid to cleanse the stall area in a barn.

DETAILED DESCRIPTION OF THE PREFERRED EMBODIMENTS

In FIG. 1, the valve according to the invention is designated generally by the reference numeral 10 for controlling the flow of fluid 11 through a passage 12 defined in a fluid distribution system designated generally by the reference numeral 13. The fluid distribution system 13 includes means for storing a volume of fluid 11 in an area defined by a plurality of retaining walls 14 in combination with a wall 15 which defines the fluid passage 12.

As best seen in FIG. 2, a fluid impermeable member is defined by a fluid impermeable plate 17 which is fixably secured to a support member 18 defined, for example, by the rim of a vehicle wheel. A resilient elastomeric sealing member 19 is secured to the support member 18 and cooperates with the fluid passage 12 to effect a sealing relationship therewith when the valve is in its closed position. When the pneumatic tire 19 is inflated to a pressure less than that necessary to assert a relative rigidity to the tire 19, an effective sealing arrangement is achieved despite irregularities in the contour of the passage by the flexibility of the underinflated tire.

By way of a specific example, a tire inflated to a pressure of 10 lbs per square inch has operated satisfactorily to achieve the sealing described.

Means designated generally by the reference numeral 21 are provided for selectively locating the position of the fluid impermeable plate 17, the rim 18, and the tire 19 as a unit relative to the fluid passage 12. The locating means 21 include a winch 23 comprising a rotatable member 24 which secures at least a portion of a cable 25. An end 26 of the cable 25 is secured to the fluid impermeable plate 17 and passes over a direction orienting pulley 28 located on a wall 14 which is spaced apart from the wall 15 defining the passage 12.

The cable 25 is connected from pulley 28 and has at least a portion thereof wrapped about the rotatable member 24 in the winch 23 from which it is secured to the rim 18 at the attaching member 30 after passing over a second direction orienting pulley 31. Preferably, a single length of cable is used having one end 26 located to the fluid impermeable plate 17 and the other end located to the securing member 30 of the valve, although plural lengths of cable may also be used.

The pulley 31 is secured to an L-shaped member 33 which is secured to the wall 15 so that it traverses the fluid passage 12. In this position, the cable 25 exerts a force on the rim 18 in a direction approximately normal to the central plane of the rim 18. Since the member 30 is secured at or near the portion of the rim which is a maximum from the pivot axis for the unit, the moment exerted on the valve in its closed position is maximized. Thus, the valve unit may be securely located to stop fluid flow through the passage 12.

A manually operable chain member 35 is secured about a rotatable member 36 which is secured to the rotatable member 24 in the winch 23 for manually controlling the opening and closing of the valve.

A mechanism designated generally by the reference numeral 37 is provided for causing the unit to pivot about a pivot pin 38 which is secured by the opposite legs 39 of a U-shaped member 40 which is secured to the inner portion of the wall 15 by a securing member 42, such as a bolt. A pair of generally V-shaped members 44 are pivotably secured about the pin 38 and are fixably secured to the fluid impermeable plate 17. Thus, upon rotation of the chain 35 in the winch 23 causing rotation of the rotatable member 24, the cable 25 causes the unit to pivot into and out of a sealing relationship with the passage 12. By this arrangement, the valve may be positioned to prevent the flow of fluid through the passage, to permit a maximum flow of fluid through a passage, or to be positioned in a location intermediate the maximum and no flow positions. A representative open position for the valve unit is shown in FIG. 4. The arrangement thus described provides the significant advantage of causing a positive opening or positive closing of the valve by manual operation and also permits the valve to be set at any intermediate degree of opening desirable.

FIG. 5 illustrates a plan view of an environment in which the valve according to the invention may be used to great advantage. As shown, the wall 15 separates the volume of water stored in a location defined by the walls 14 from the stall portion of a barn designated generally at 50. The barn includes a plurality of stalls 51 for housing livestock arranged in spaced rows 52 and 53 of adjacently aligned stalls. A concrete slab 54 separates the adjacent rows of stalls 52 and 53. When it is desired to clean the concrete slab 54 from its accumulated wastes, the fluid stored in the tank defined by walls 14 is controllably released through the passage 12 as indicated by the arrows designated generally by the reference numeral 15.

In an actual embodiment, such a system has provided significant cleaning advantages for the concrete slab which is approximately 400 feet long by the use of approximately 2,500 gallons of water stored in a storage tank defined by the walls 14 having dimensions about 6 feet by 12 feet and which are about 3 and ½ feet high. In this particular application, it took about 1 minute for the volume of water to flood the stall and the water continued to flow over the slab 54 for about 2 minutes.

While a number of systems for cleaning stalls are known, including one in which a square rectangular door is dropped from a vertical to a lateral position to release water stored behind the door for cleaning a stall, the method thus described using the valve according to the invention is far superior at least for the reason that the water is released in a smaller amount and continues to flow over the floor 54 for a longer period of time.

Thus, a valve which may be manufactured in situ from commercially available parts has been described which may be readily used in controlling the cleaning of a barn.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. A valve for controlling the flow of fluid through a passage defined in a fluid distribution system, said valve comprising:
    a fluid impermeable member characterized in that said member may be located both in a first position which permits no flow of fluid through said passage and in a second position which permits a maximum flow of fluid through said passage;
    a support member, said fluid impermeable member being secured to said support member;
    an elastomeric; resilient, pneumatic sealing member, secured to said support member;
    wherein said fluid impermeable member, said support member and said elastomeric member are locatable as a unit for sealing said passage to prevent fluid flow through said passage when said fluid impermeable member is located in its first position; and
    means for selectively locating the position of said fluid impermeable member relative to said passage in any of a range of positions defined between and including said first position and said second position, said locating means including cables secured to said fluid impermeable member and extending therefrom in generally opposite directions so that the fluid impermeable member may be fixedly located at any position within said range relative to said fluid passage by force applied to said fluid impermeable member, in either of said generally opposite directions, through said cable.

2. The valve as defined in claim 1 wherein said locating means includes winching means for controlling the movement and location of said fluid impermeable member, said winching means includes a selectively actuable rotatable member securing at least a portion of said cable.

3. The valve as defined in claim 2 wherein said winching means further includes means for actuating said rotatable member.

4. The valve as defined in claim 3 wherein said locating means further includes pivoting means for causing said fluid impermeable member to pivot between said first position and said second position when said rotatable member in said winching means is actuated.

5. The valve as defined in claim 4 wherein said pivoting means includes:
    a pivot pin;
    means for securing said pivot pin in a fixed location; and
    a bracket member pivotably secured to said pivot pin and fixedly secured to said fluid impermeable member.

6. The valve as defined in claim 5 wherein said support member is a vehicle wheel rim, said elastomeric member is a pneumatic vehicle tire mounted on said rim, and said fluid impermeable member is secured to said rim so that said tire, said rim, and said fluid impermeable member cooperate as a unit with said fluid passage to prevent fluid flow through said passage when said valve is in a closed position.

7. A valve located in a fluid distribution system which defines a fluid passage for controlling the flow of fluid through said passage, said valve comprising:
    a vehicle wheel rim;
    a pneumatic vehicle tire secured to said rim;
    a fluid impermeable member secured to said rim so that said member, said rim, and said tire cooperate as a unit; and
    means, in an operative relationship with said unit and said fluid distribution system, for selectively locating the position of said unit relative to said fluid passage to control the flow of fluid through said passage.

8. The valve as defined in claim 7 wherein said means is further characterized as selectively locating the position of said unit relative to said passage in any of the range of positions between and including a first position which permits no flow of fluid through said passage and a second position which permits maximum flow of fluid through said passage.

9. The valve as defined in claim 8 wherein said locating means includes cable secured to said unit which extends in approximately opposite directions thereto for controlling movement of said unit toward either of said first or said second positions; and means for causing movement of said cable to effect the opening, closing and intermediate positions of said unit.

10. The valve as defined in claim 9 further including means for causing said unit to pivot about an axis between said first position and said second position.

11. The method of controlling the flow of fluid through a passage for laving an area adjacent the passage comprising the steps of:
providing a source of fluid;
positioning a valve member defined by a vehicle wheel rim, a pneumatic vehicle tire secured to said rim and a fluid impermeable member secured to said rim in a position relative to said passage to control the flow of fluid therethrough;
mechanically providing force to said valve member in a first direction in order to remove said member from a sealing relationship with said passage;
laving said area adjacent said passage with a relatively large volume of said fluid for a relatively small amount of time; and
mechanically providing a force to said member in a direction generally opposite to said first direction in order to relocate said valve member in a sealing relationship with said passage.

12. The method as defined in claim 11 wherein the first step of providing force to said valve member is further defined in that said valve member is fixedly located without a sealing relationship with said passage.

13. The method as defined in claim 11 wherein the step of providing a source of fluid includes the step of storing a volume of water in a position in a first volumetric space adjacent to said passage and said step of laving is further characterized as laving a surface located adjacent to said passage in a direction opposite to the side of said passage on which said fluid is stored by a controlled flow of fluid thereon.

14. The method as defined in claim 13 wherein said step of laving is further defined as laving a substantially horizontal surface with said fluid.

15. The method as defined in claim 13 wherein said step of laving is further defined as laving a barn floor of accumulated wastes.

* * * * *